Jan. 10, 1928.
J. L. DRAKE
1,656,102
SHEET GLASS APPARATUS
Filed July 19, 1926
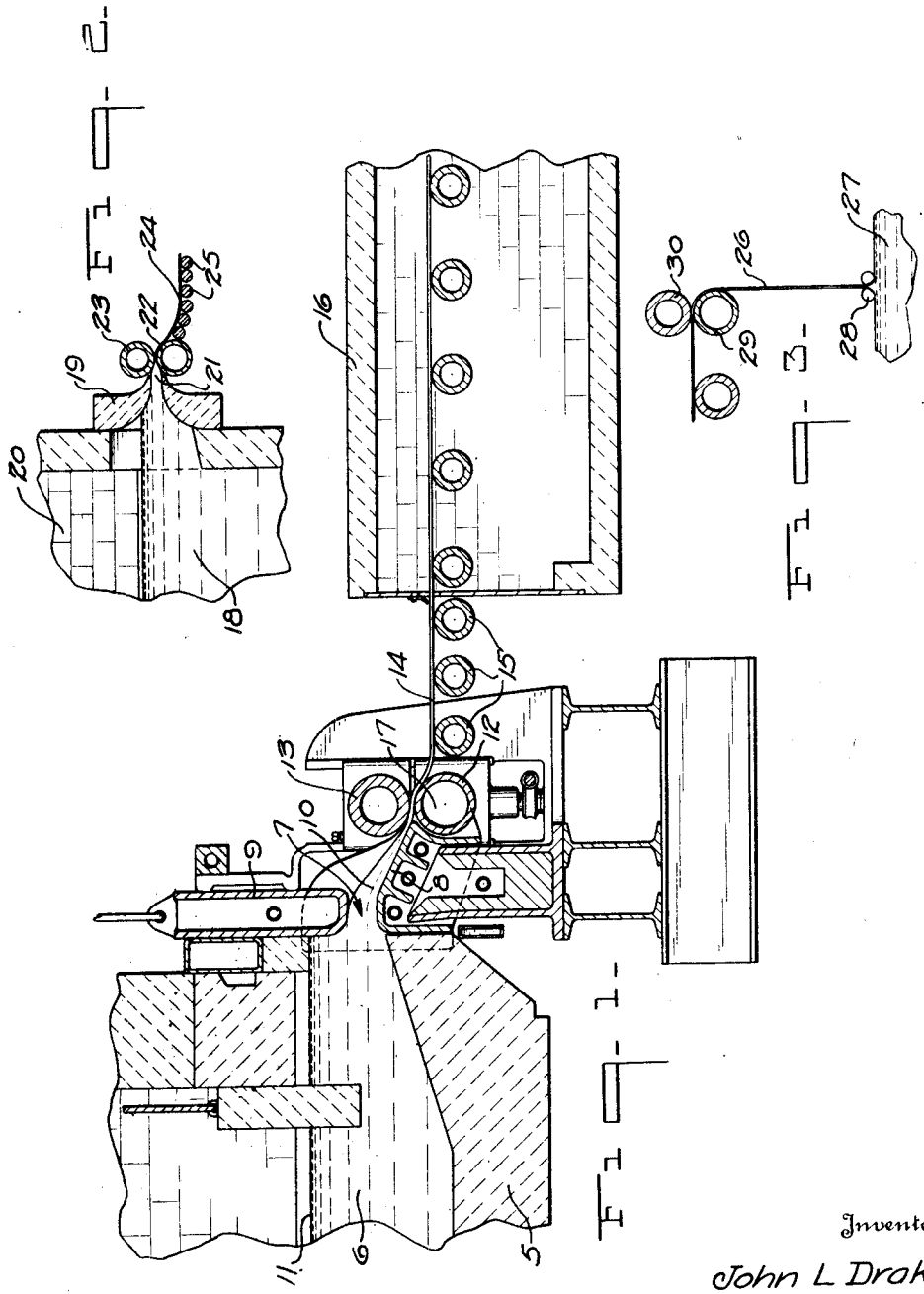
Inventor
John L Drake
By Frank Fraser
Attorney Patented Jan. 10, 1928.

1,656,102

UNITED STATES PATENT OFFICE.

JOHN L. DRAKE, OF TOLEDO, OHIO, ASSIGNOR TO THE LIBBEY-OWENS SHEET GLASS COMPANY, OF TOLEDO, OHIO, A CORPORATION OF OHIO.

SHEET-GLASS APPARATUS.

Application filed July 19, 1926. Serial No. 123,414.

The present invention relates to sheet glass apparatus.

An important object of the invention is to provide in sheet glass apparatus means for forming a sheet of glass including members contacting with opposite sides of said sheet, the temperature of the said members being so controlled that the temperature of the sheet is substantially the same on both sides thereof after passing between said members.

Another object of the invention is to provide in sheet glass apparatus a pair of rolls between which a sheet of glass passes, one side of said sheet having greater contact with one of the rolls than it has with the other, and including means whereby the roll having the greatest contact is adapted to absorb more heat from the sheet than the other of said rolls.

A further object of the invention is to provide an apparatus of this nature including a pair of rolls between which a sheet of glass passes, one side of said sheet being relatively hotter than the other side thereof, the roll contacting with the hottest side having a thinner wall than the other of said rolls, whereby relatively more heat is absorbed by the roll contacting with the hottest side of the sheet.

A still further object of the invention is to provide a pair of rotatable rolls between which a sheet of plastic glass is adapted to be passed, the sheet of glass having one side hotter than the other side thereof, the hotter side contacting with its respective roll to a greater extent than the opposite side, the roll contacting with the hotter side having a wall relatively thinner than the wall of the other roll, whereby relatively more heat is absorbed by the roll having the thinnest wall.

Still another object of the invention is to provide a pair of rolls of this nature, the wall of one of the rolls being thinner than the wall of the other whereby heat is absorbed from said roll more rapidly than the other roll.

Other objects and advantages of the invention will become apparent during the course of the following invention.

In the drawings wherein like numerals are employed to designate like parts throughout the same, Fig. 1 is a fragmentary vertical longitudinal section through a sheet glass forming machine, Fig. 2 is a sectional detail of another form of sheet glass machine, and Fig. 3 is a fragmentary sectional view illustrating diagrammatically still another form of machine.

The present invention relates particularly to those types of sheet glass producing machines wherein a sheet or body of glass is adapted to be passed between a pair or more of rolls. Three different types of machines have been illustrated, but it is to be understood that the invention contemplates any construction wherein a sheet of glass, or a body of glass from which a sheet is produced, is brought into contact with a plurality of rolls.

In the constructions illustrated, and especially in Fig. 1, the numeral 5 designates a furnace containing a mass of molten glass 6. The molten glass in the construction illustrated is adapted to flow through an outlet 7 whereby the molten glass is permitted to flow down a heated slab 8. An adjustable member 9 is used and adapted to cooperate with a portion of the slab to control the effective opening through which the glass flows. It is desirable that the glass 10 flowing down the slab be urged by the head pressure of the molten glass 6, and to accomplish this the surface 11 of the molten mass 6 is higher than the discharge opening 7. It will be seen that the molten glass on the slab is fed from a substratum in the tank 5.

Arranged at the end of the slab 8 are rolls 12 and 13, arranged to form a sheet forming pass therebetween. The stream 10 is passed between the rolls to form a sheet 14, which may be conveyed on the rolls 15 and through an annealing leer 16. It will be seen that the flow of glass 10 is exposed along its upper surface, while the under surface being upon the slab would have a tendency to retain its heat longer than the exposed surface. In addition, due to the weight of the sheet, etc., there is greater contact between the sheet and the lower roll 12 than there is between the sheet and the upper roll 13.

To compensate for the greater contact and the hotter side of the sheet engaging the lower roll 12, in accordance with the present invention the wall of this roll is relatively thinner than the wall of the upper roll 13. It will be seen that the rolls are provided with internal bores 17 through which suitable temperature control mediums may be circulated. The sheet passing between the rolls, as constructed, will be of a more uniform nature than where the walls of rolls are of the same thickness.

In Fig. 2 the molten glass 18 is adapted to be passed between suitable outwardly extending lips 19 associated with a tank 20. The glass is adapted to flow through a slot 21 created by the lips 19, preferably under the head pressure of the glass in said tank. Arranged adjacent the lips 19 is a pair of rolls 22 and 23 which create a sheet forming pass to reduce the molten mass of glass to a sheet 24 conveyed away on the rolls 25. It will be seen that the sheet contacts with the lower roll 22 more than it does with the upper roll 23, and therefore in accordance with this invention the wall of said lower roll is formed relatively thinner than the wall of the upper roll.

In Fig. 3 is shown a modified form of Colburn machine, wherein a sheet 26 is adapted to be continuously withdrawn from a mass of molten glass 27, the width of the sheet being maintained by means of the members 28 arranged at the base of said sheet. The sheet is initially drawn in a vertical plane for a substantial distance, after which it is deflected about a member 29 into a substantially horizontal plane. A supplementary roll 30 may be associated with the roll 29 to flatten the sheet as it passes therebetween. As the sheet contacts to a greater extent with the lower or deflecting roll 29, the wall thereof is constructed relatively thinner than the wall of the upper or supplementary roll 30.

It has been found in actual practice with a machine similar to the disclosure in Fig. 2, that the lower roll, if as thick as the upper roll, becomes hot permitting the glass to stick thereto, which causes the glass to wrap around the roll with the possibility of breaking the refractory lips 19. However with the rolls illustrated, this wall permits a more rapid cooling of the roll, which obviates overheating with consequent sticking.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus a receptacle containing a mass of molten glass, a pair of rolls between which the glass passes in sheet form, said sheet having greater contact with one of said rolls than the other, the wall of the roll having greater contact with the sheet being relatively thinner than the wall of the other roll.

2. In sheet glass apparatus a receptacle containing a mass of molten glass, a pair of rolls between which the glass passes in sheet form, one side of said sheet being relatively hotter than the other side thereof, the wall of the roll contacting with the hotter side of the sheet being relatively thinner than the wall of the other roll.

3. In sheet glass apparatus a receptacle containing a mass of molten glass, a pair of rolls between which the glass passes in sheet form, one side of the sheet being relatively hotter than the other side thereof, the hotter side of said sheet having greater contact with its respective roll than the other side with its respective roll, the wall of the roll contacting with the hotter side of said sheet being relatively thinner than the wall of the other roll.

4. In sheet glass apparatus, a receptacle containing a mass of molten glass, a pair of rolls arranged to create a sheet forming pass, means to advance molten glass to the pass where it is rolled into a sheet, said sheet contacting with one of the rolls for a longer period of time than the other of said rolls, the wall of the first mentioned roll being relatively thinner than the wall of the other roll.

5. In sheet glass apparatus, a receptacle containing a mass of molten glass, a pair of rolls arranged to create a sheet forming pass, means to supply glass thereto where the glass is rolled into a sheet, said sheet being deflected over one of said rolls, the wall of the roll over which the sheet is deflected being relatively thinner than the wall of the other roll.

6. In sheet glass apparatus, a receptacle containing a mass of molten glass, a pair of rolls mounted in a manner to create a sheet forming pass, one of said rolls being arranged substantially above the other, the wall of the lower roll being relatively thinner than the wall of the other roll.

Signed at Toledo, in the county of Lucas and State of Ohio, this 16th day of July, 1926.

JOHN L. DRAKE.